H. STEPHENS.
Making Colors.
No. 441.
Patented Oct. 28, 1837.
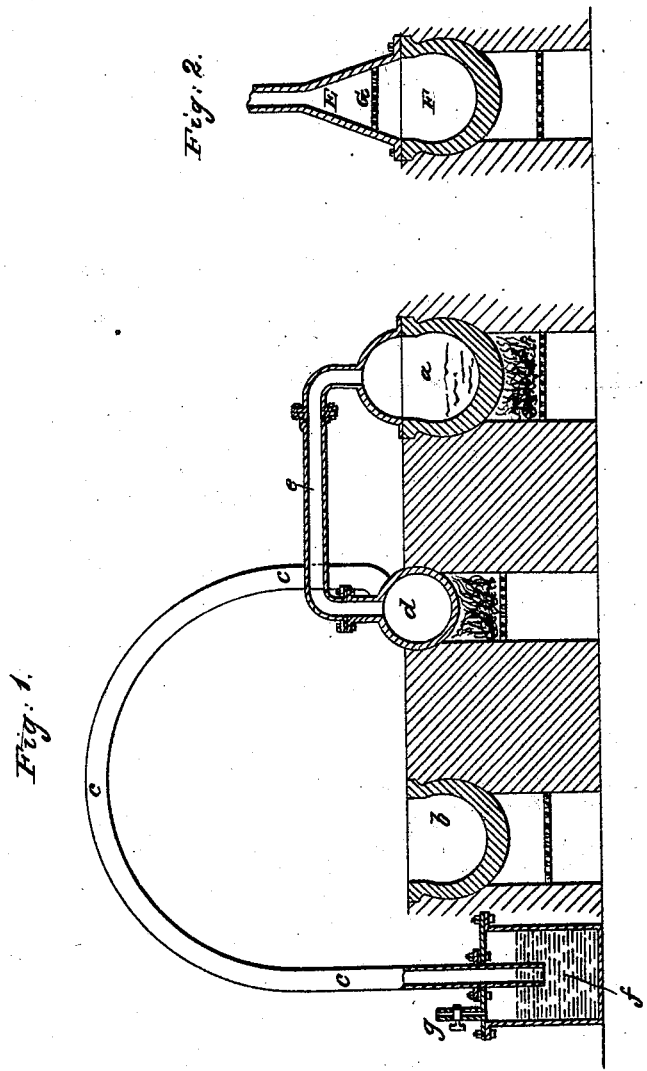
Witnesses:
Inventor:
Henry Stephens.

UNITED STATES PATENT OFFICE.

HENRY STEPHENS, OF ST. MARY-LA-BONNE PARISH, MIDDLESEX COUNTY, ENGLAND.

MANUFACTURE OF COLORING-MATTER.

Specification of Letters Patent No. 441, dated October 28, 1837.

*To all whom it may concern:*

Be it known that I, HENRY STEPHENS, a subject of the King of Great Britain, and now residing in Charlotte street, in the parish of St. Mary-la-Bonne, in the county of Middlesex, in the said Kingdom, have invented or discovered a new and useful invention or discovery of certain Improvements in Manufacturing Coloring - Matter and Rendering Certain Color or Colors Applicable to Dyeing, Staining, and Writing; and I do hereby declare that the following is a full and exact description thereof—that is to say:

My invention of certain improvements in manufacturing coloring matter and rendering certain color or colors applicable to dyeing, staining, and writing applies to the dissolving or rendering soluble the ferro prussiates or what is commonly called or known by the name of Prussian-blue which has hitherto been considered insoluble.

It consists in a method of rendering the ferro prussiates or Prussian blue soluble so as to be available for many useful purposes such as dyeing, staining, and writing and is effected by the application, commixture, or adaptation of oxalic acid, which has never hitherto been used for this purpose, nor has Prussian blue been heretofore so rendered soluble and applicable by such means to the above-named purposes.

The chief obstacle to the general employment of the beautiful color obtained by means of the ferro prussiates to the purposes of dyeing in the cotton silk or woolen manufactures and also to the purposes of staining and writing has been its hitherto supposed insoluble nature, but by means of oxalic acid (whether obtained by the usual process of mixing or distilling saccharine matter in combination with nitric or any other acid, or from vegetable or other substances containing oxalic acid, or from combinations of oxalates whether metallic, earthy, or alkaline) I obtain a perfect solution of the ferro prussiates which is applicable to dyeing, coloring, or staining in the various manufactures of woolens, silks, cottons, paper, and such other purposes and is also available to the purposes of writing or of forming a writing fluid or ink to be used with steel, quill or other pens; and in order that my invention or discovery and the manner of carrying the same into effect may be better understood I will briefly state and describe the simple way of treating or operating upon Prussian blue by the above named application of oxalic acid which I have found to answer the purpose, and such proportions as will produce the desired effect, although I do not mean or intend to confine myself to the precise method process or proportions hereinafter set forth as the same may be varied and modified according to the different purposes for which the solution is required and which every practical chemist or dyer will know or obtain by experiments when he is once aware of the fact that the ferro prussiates are soluble by means of oxalic acid, that is to say:

I take the oxalic acid in the crystallized state and the Prussian blue in the state of pigment or as these articles are commonly sold and manufactured for commerce and these I compound, mix, or grind together in a mortar or other such suitable vessel at the same time adding gradually in small quantities pure cold water and the result is a perfect solution of the ferro prussiates or Prussian blue which will pass through a filter in its colored state, care being taken that the cold water is pure or does not contain any proportion of lime or does not abound in saline matters, or the same effect may be produced by pouring a solution of oxalic acid upon the Prussian blue previously ground or pulverized, the whole being well stirred or agitated; but I prefer the first named process, as it is the most simple, and I have found the proportions of about three parts of oxalic acid to one of Prussian blue the most complete solvent. Should any portion of the Prussian blue remain undissolved, by pouring off the supernatant solution and adding more water to the residuum the whole may be taken up in solution. This beautiful color in solution is applicable to the purposes of writing and for forming a writing fluid or ink by adding thereto so much water as will render the solution sufficiently fluid for the purpose or of a sufficient depth of color but the solution may be rendered as weak or as light colored as desired for any other purpose by adding more water at the time of mixing.

Having thus described the method of obtaining this solution of the ferro prussiates or Prussian blue I would in conclusion remark that it will be readily understood by all practical chemists and dyers that admitting the power of oxalic acid to hold ferro prussiates in solution that this effect may be produced in a variety of ways which would still contain the basis and principle of my invention or discovery. For example, by first making an oxalate of iron and mixing portions of it with a solution of alkaline prussiate a soluble ferro prussiate may be formed and it was by such means the invention or discovery was made by me.

It will also be understood that by combining any of the oxalates whether metallic, alkaline or earthy the oxalic acid may be made to unite with the ferro prussiates while the metallic, earthy, or alkaline base may be subtracted by other agents to which it has a stronger affinity.

I therefore wish it to be understood that I claim as my invention or discovery—

The making or obtaining the solution of the ferro prussiates or Prussian blue by the application or admixture of oxalic acid however obtained, also the making or obtaining such solutions of the ferro prussiates or Prussian blue by any combinations of saccharine matters with any acids and also the making or obtaining the said solutions of the ferro prussiates or Prussian blue by the means of oxalates whether metallic earthy or alkaline as all these means contain more or less the discovery or the invention which I claim as my invention and secured to me by patent right and finally I would remark that it is well known that oxalic acid is less liable to injure the texture of woven fabrics or paper than any of the mineral acids, therefore this solution will not be objected to in dyeing and coloring in the manufactures.

In witness whereof I, the said HENRY STEPHENS, have hereunto set my hand and seal this sixth day of June, in the year of our Lord one thousand eight hundred and thirty seven.

HENRY STEPHENS. [L. S.]

Witnesses:
 MILES BERRY,
 JOSEPH STEVENS SMITH.